Oct. 6, 1942.     L. O'RUSSA     2,298,152
DECORATIVE MEMENTO
Filed March 7, 1941
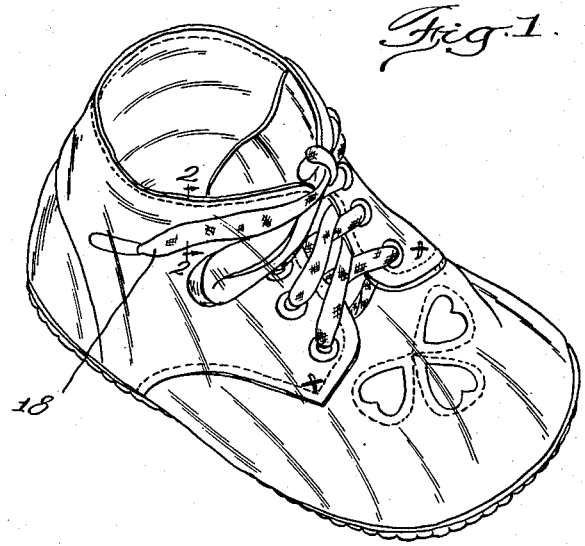
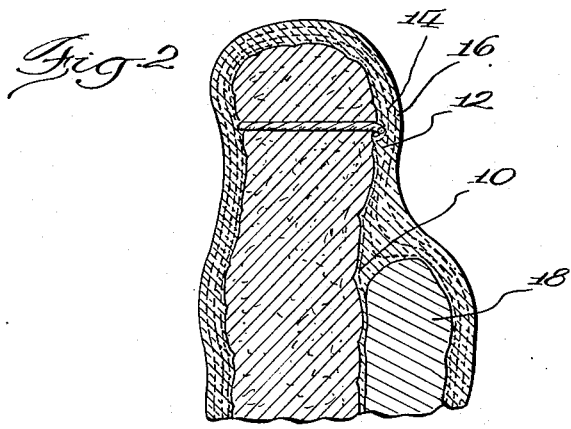
Inventor.
Lorence O'Russa
By Williams, Bradbury & Hinkle
Attys Patented Oct. 6, 1942

2,298,152

UNITED STATES PATENT OFFICE 2,298,152

DECORATIVE MEMENTO

Lorence O'Russa, Princeville, Ill.

Application March 7, 1941, Serial No. 382,216

1 Claim. (Cl. 41—10)

My invention relates generally to mementoes, and more particularly to a decorative memento comprising a normally flexible article of wearing apparel, or the like, which has been rendered inflexible and preserved against the ravages of time by encasing it in transparent plastic material conforming generally to the shape of the article.

Many parents keep baby's shoes, ribbons, bonnets, mittens, gloves and similar articles of wearing apparel as mementoes of the babyhood of their children. In the course of time, these keepsakes lose their freshness of appearance and their aesthetic value is considerably lessened.

In the past, efforts have been made to preserve the sentimental value of infant's shoes and to render them suitable for use as ornaments by coating them with a bronze or silver enamel which resists deterioration of the surface of the finished article. However, the enamels which have heretofore been used cover the surface of the shoe with an opaque coating so that the individuality of the article is lost.

It is, therefore, an object of my invention to improve upon prior efforts to preserve such articles of infant's apparel, and similar articles, by providing a relatively thin, clear, transparent case of plastic material intimately bonded to the article which renders the article substantially rigid and preserves to view every nick, mark, scuff and crease, so that the article maintains its original appearance.

A further object is to provide a normally flexible article of apparel enclosed in a clear, transparent plastic case which is intimately bonded to the article, does not destroy the colors originally present, and which seals the leather or fabric which composes the body of the article from deterioration through the action of air or moisture and safeguards it from damage by moths and other vermin.

A further object is to provide a normally flexible infant's garment with a clear, transparent plastic coating which will act as a bond to retain various identifying tokens, such as wisps of hair, labels bearing birth dates, monograms and the like, to the article of clothing.

Other objects will appear from the following description, reference being had to the accompanying drawing, in which:

Fig. 1 represents a baby's shoe enclosed in a case of transparent plastic composition intimately bonded thereto; and Fig. 2 shows a cross section taken along the plane 2—2 of Fig. 1.

The plastic which may be used to encase the articles of apparel may be Lumarith (a cellulose acetate plastic), Vinylite (a poly-vinyl resin), Lucite (a methyl methacrylate resin), cellulose acetate or the like. I have found that cellulose acetate forms a case having desirable characteristics of clearness, transparency and rigidity and may be easily applied. The cellulose acetate is dissolved in acetone and sufficient diacetone alcohol is mixed with the resulting solution to retard its drying and hardening. The rate at which the solution hardens should be moderately slow so that the resulting case will be perfectly smooth and free from bubbles and other defects.

The case may readily be formed by applying the plastic solution in a series of layers or coats 10, 12, 14 and 16, as indicated in Fig. 2. The solution is applied at room temperature, approximately 70° F., so that the plastic hardens at a proper rate. The solution of plastic may be applied by a brush, as a spray, or by dipping the article to be coated in the solution. The various layers coalesce so that the multiple layer effect, indicated in Fig. 2, is not visible in the finished product.

The article is preferably brushed with a dry brush to remove particles of dust and the like which might otherwise become loosened in the process of applying the plastic and mix with the casing material to impair the transparency of the surface of the resulting article. During the application of the first, or the first few layers of the plastic casing material, if the article is of a construction which requires it, it may be stuffed with tissue paper or otherwise retained in the shape ultimately desired. Such shape retaining means may be removed during the application of subsequent layers.

Referring to Fig. 2, a relatively dilute plastic solution is preferably used as the first, or impregnating, layer 10, and is usually most conveniently applied with a brush. The dilute solution flows freely into the pores and interstices of the article and becomes firmly bonded thereto, increasing the stiffness of the article itself. After the application of the initial layer, and while it is still tacky, various loose parts of the shoe, such as the laces 18 of the shoe shown in Fig. 1, are placed in the position they are to retain in the finished article. Various identifying tokens, such as monograms, wisps of hair, slips of paper bearing identifying legends, and the like, may be applied at this time. The loose parts adhere to the surface and remain in place during the completion of the plastic case.

The remaining layers of plastic case may then be applied in any convenient manner, preferably by dipping the article into solutions of increasing percentages of plastic content, giving the plastic an adequate opportunity to set and dry before the application of each successive layer. The plastic fills in minor surface irregularities and depressions so that the finished article has a smooth, unbroken surface which conforms generally to the shape of the original article.

The thickness of the plastic may vary considerably, depending upon the character and use of the encased article, although for an article, such as a baby's shoe herein shown for purposes of illustration, a thickness of approximately one thirty-second of an inch will usually be found to be satisfactory. The number of applications of plastic solution to produce a case of a given thickness will vary according to the plastic content of the solution and the method of application. The case need only be thick enough to provide a relatively rigid supporting structure for the finished keepsake.

I have found that the completion of the setting, hardening or drying of the plastic is facilitated, and the quality of the resultant case is improved, by heating the article after the plastic solution has had adequate opportunity to dry. When using the cellulose acetate solution this heating is conveniently performed by placing the article in a drying oven which is electrically heated to a temperature of approximately 140° F. Approximately one-half hour of heating is required to set and dry the plastic thoroughly.

A baby's shoe enclosed in and intimately bonded to a transparent plastic case of clear plastic material has a rigidity similar to that of an article made of horn, and may conveniently be incorporated in a bookend, paper weight, or the like. The plastic case is not fragile since it is reinforced by the leather or fabric of the shoe, or both, and thus is very durable. The smooth plastic surface is waterproof and may easily be wiped free from dust and dirt, and the shoe will retain its individuality for many years without deterioration. Since the case is intimately bonded to the article, only the outer surface of the case is effective in reflecting light, thus adding to the naturalness of the appearance of the encased article.

I claim:

A decorative memento comprising an originally flexible article of apparel enclosed in and intimately bonded to a case of transparent plastic material conforming closely in shape to that of the article of apparel and of sufficient thickness to provide the article with a firm relatively rigid supporting structure, whereby the original coloring, marking, and general appearance of the article are preserved while it is protected against deterioration and soiling.

LORENCE O'RUSSA.